United States Patent

Poot et al.

[15] 3,642,484

[45] Feb. 15, 1972

[54] UNSATURATED PHOTOCHROMIC INDOLINO-SPIROPYRAN MONOMERS AND POLYMERS PREPARED THEREFROM

[72] Inventors: Albert Lucien Poot, Kontich; Gerard Albert Delzenne, 'S-Gravenwezel, both of Belgium

[73] Assignee: Gevaert-Agfa N.V., Mortsel, Belgium

[22] Filed: Sept. 11, 1969

[21] Appl. No.: 857,226

[30] Foreign Application Priority Data

Oct. 3, 1968 Great Britain......................46,948/68

[52] U.S. Cl...............................96/90, 96/35.1, 96/115 P, 260/41 C, 260/326.11, 260/345.2
[51] Int. Cl........................................F21v 9/10, G02b 5/20
[58] Field of Search...........................96/90, 115 P, 35.1, 27; 260/41 C, 326.11, 345.2; 350/160 P; 106/176

[56] References Cited

UNITED STATES PATENTS

| | | | |
|---|---|---|---|
| 3,090,687 | 5/1963 | Berman | 96/27 X |
| 3,212,898 | 10/1965 | Cerreta | 96/90 |
| 3,242,122 | 3/1966 | Cheng | 260/326.11 X |
| 3,322,678 | 5/1967 | Dorion | 96/90 X |
| 3,364,023 | 1/1968 | Becker | 96/90 X |
| 3,485,765 | 12/1969 | Newland | 260/41 |
| 3,486,899 | 12/1969 | Brown | 96/90 |
| 3,501,410 | 3/1970 | Newland | 96/90 X |
| 3,510,308 | 5/1970 | Foris | 96/90 |

Primary Examiner—John T. Goolkasian
Assistant Examiner—M. E. McCamish
Attorney—Alfred W. Breiner

[57] ABSTRACT

Photochromic unsaturated monomeric indolino-spiropyrans and the polymers and copolymers prepared therefrom are described. These photochromic materials in a light-sensitive photographic system containing a photohardening polymeric system provide nonfading photographic images.

9 Claims, No Drawings

UNSATURATED PHOTOCHROMIC INDOLINO-SPIROPYRAN MONOMERS AND POLYMERS PREPARED THEREFROM

This invention relates to unsaturated photochromic monomeric materials, to photochromic polymers prepared therefrom and to photographic materials capable of forming nonfading images on exposure to actinic light.

In Belgian Pat. Spec. No. 712,084 a light-sensitive photographic material is described, which is capable of forming nonfading images on exposure to actinic light and comprises a light-sensitive layer or stratum containing a photochromic material and a photohardening polymeric system. The photochromic materials, which may be used are described by Richard Exelby in Chem.Rev., 65, 247–260 (1956). Among these the spiro compounds constitute a preferable class, especially the indolino-spiropyrans.

e.g., has been found now a special class of indolino-spiropyrans, e.g. unsaturated monomeric indolino-spiropyrans and the polymers and copolymers prepared therefrom, which very conveniently can be used as photochromic compounds capable of forming nonfading photographic images when they are applied as photochromic material in a light-sensitive photographic system according to Belgian Pat. Spec. No. 712,084.

According to the invention unsaturated photochromic monomeric indolino-spiropyrans are provided, which are substantially colorless and are reversibly colored by themselves upon irradiation with actinic light, said monomeric indolino-spiropyrans corresponding to the general formula:

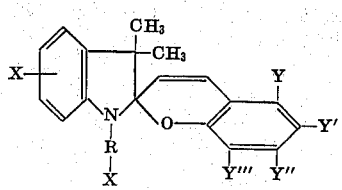

wherein:

R represents an alkylene group having one to 11 carbon atoms, a phenylene group, or a toluylene group, one of the X's represents an acryloyloxy group or a methacryloyloxy group, the other X representing a hydrogen atom, Y and Y" each represent a hydrogen atom, a nitrile group, an acetyl group, a carboxyl group, a hydroxyl group, a nitro group, a methoxy group, a chlorine atom, or a bromine atom, Y' represents a hydrogen atom, an acetyl group, a carboxyl group, a nitro group, a chlorine atom, or a bromine atom, and Y''' represents a hydrogen atom, a nitro group, a chlorine atom, or a bromine atom.

One group of the monomeric indolino-spiropyrans can be prepared by allowing to react a 6-hydroxy-2-methylene-3,3-dimethyl-indoline with a properly substituted salicylaldehyde and by converting the indolino-spiropyran obtained with acryloyl chloride or methacryloyl chloride into a 6-(meth)acryloyloxy indolino-spiropyran. The other group is prepared by starting from a 1-hydroxyalkyl-2-methylene-3,3-dimethyl-indoline, which is made to react with a salicylaldehyde and the indolino-spiropyran obtained is converted with acryloyl chloride or methacryloyl chloride into a N-(meth)acryloyloxy-alkyl-indolino-spiropyran.

The monomeric unsaturated indolino-spiropyrans of the invention can be polymerized alone or together with at least one other ethylenically unsaturated monomer by free radical initiation to promote the polymerization reaction. In the copolymerization of the unsaturated indolino-spiropyran any ethylenically unsaturated monomer, which is known to copolymerize with acrylic or methacrylic acid esters, can be applied. Particularly valuable are styrene, acrylic acid esters, and methacrylic acid esters. The homopolymers and copolymers obtained have also photochromic properties.

In a special and very interesting embodiment of the invention the unsaturated indolino-spiropyrans of the invention are copolymerized with monomers comprising photo-cross-linking groups. Photohardening polymeric systems formed from monomers containing photo-cross-linking groups have been described i.a. in the United Kingdom Pat. Specs. Nos. 1,074,234, 1,087,416, 1,115,427 and 1,089,095 and in the published Dutch Pat. Application No. 6610999.

When mixing a photochromic monomer or polymer according to the invention with a photohardening polymeric system, or when using a polymer having both photochromic monomeric units according to the invention and photo-cross-linking groups as described above, a photochromic composition is obtained. When dissolving this photochromic composition in a solvent or in a mixture of solvents, the solution obtained can be coated on a support to form layers of the photochromic composition. Suitable supports are i.a. metal sheets, glass cellulose ester films, polystyrene films, polyester films, paper either or not coated with a covering layer e.g., a baryta layer.

When exposing such a layer uniformly to actinic light or when exposing it through a line original or a screen, the photochromic composition will change color at the exposed areas. Normally such color change would fade out, i.e., on exposure to light, usually of a longer wavelength, or during storage in the dark, the color disappears.

However, this is not so when applying the system according to the present invention, which also comprises a photohardening polymeric system. The color formed upon exposure sufficient to cross link the photohardening system, is preserved to a large extent. If the exposure was performed through a line original or a screen, a nonfading image is formed from this line original or screen.

The following examples illustrate the invention.

EXAMPLE 1

5.7 g. of 1,3,3-trimethyl-2-methylene-6-hydroxy-indoline, prepared starting from the corresponding 3-H-indolium salt as described in the United Kingdom Pat. Application No. 1320/68, were dissolved in 20 ccs. of methanol, to which solution 5 g. of 5-nitrosalicylaldehyde were added. The red solution was refluxed for 4½ hours on a water-bath. After cooling, the precipitate was sucked off, boiled twice with 50 ccs. of methanol, and dried in vacuo.

Yield : 7 g of 1',3',3'-trimethyl-6'-hydroxy-6-nitrospiro-[2H,1-benzopyran-2,2'-indoline]

3.38 g. of this compound and 1.5 g. of methacryloyl chloride were dissolved in 100 ccs. of acetone. While stirring at room temperature 15 ccs. of 1N sodium hydroxide were added dropwise. Upon neutralizing the solution, a precipitate formed. After diluting with a same volume of water, the precipitate was collected, washed with water, and dried under reduced pressure over sodium hydroxide. The resulting product was dissolved in 25 ccs. of acetone and filtered. The filtrate was poured in 200 ccs. of hexane, and the precipitate dried in vacuo at 50° C.

Yield : 3.5 g. of 1',3',3'-trimethyl-6'-methacryloyl-oxy-6-nitro-spiro[2H,1-benzopyran-2,2'-indoline] of the formula

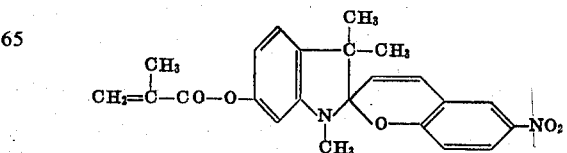

This monomer was a colorless photochromic compound the color of which upon irradiation with light turned into violet blue.

200 mg. of the above photochromic monomer, 10 ccs. of methyl methacrylate and 50 mg. of azo-bis-isobutyronitrile were dissolved in 10 ccs. of benzene. The solution formed was poured in a glass pressure tube. The oxygen was expelled with a stream of nitrogen and the tube was sealed by melting, whereafter the solution was heated in the tube at 60° C. for 90 minutes. The glass tube was then opened and the copolymer formed from methyl methacrylate and the above photochromic monomer was isolated by adding methanol. The copolymer was purified by redissolving it in benzene and adding methanol. The copolymer had also photochromic properties. It contained 20 methyl methacrylate units for every spiropyran unit.

EXAMPLE 2

2.25 g. of distilled 1-hydroxyethyl-3,3-dimethyl-2-methylene indoline were dissolved in 10 ccs. of methanol, and the solution obtained was mixed with 1.84 g. of 5-nitro-salicylaldehyde dissolved in 40 ccs. of methanol. The resulting solution was refluxed for 1 hour. After cooling, the crystalline precipitate was sucked off and recrystallized from a 1:2 volume mixture of benzene and hexane. Yield : 1 g. of 1-(2''-hydroxyethyl)-3',3'-dimethyl-6-nitrospiro[2H,1-benzopyran-2,2'-indoline].

3.5 g. of this compound and 3 g. of methacryloyl chloride were dissolved in 50 ccs. of acetone and 60 ccs. of 1N sodium hydroxide were added dropwise at 22° C. When approximately 45 ccs. of sodiumhydroxide were added, a precipitate formed. After addition of 50 ccs. the product crystallized out. The 1'-(2''(2''-methacryloyloxyethyl)-3',3'-dimethyl-6-nitrospiro[2H,1-bensopyran-2,2'-indoline] having the formula:

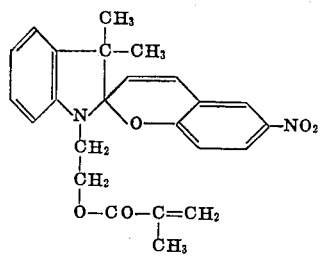

was sucked off, washed with water, and dried in the dark under reduced pressure.
Yield : 4 g.

This compound could also be prepared by the following reaction method : 10 g. of 1-(2''-hydroxyethyl)-3',3'-dimethyl-6-nitrospiro[2H,1-benzopyran-2,2'-indoline] were dissolved in 100 ccs. of dry pyridine. A tenfold excess of freshly prepared methacryloyl chloride was added while cooling. The intense pink color disappeared and a precipitate was formed. This precipitate was broken down and the mixture was stirred for further 3 hours.

Water was then added carefully while cooling, until the precipitate dissolved. The solution was poured in 1.5 liter of ice-water. The precipitated 1'-(2''-methacryloyloxyethyl)-3'. 3'-dimethyl-6-nitrospiro[2H,1-benzopyran-2,2'-indoline] was sucked off and dried under reduced pressure.
Yield : 11.4 g.

2 ccs. of methyl methacrylate, 0.2 g. of the above indolino-spiropyran and 0.02 g. of azobis-isobutyronitrile were dissolved in 10 ccs. of benzene. The solution formed was poured in a glass pressure tube, and nitrogen was conducted through the solution for 10 minutes, whereafter the pressure tube was sealed by melting and heated for 6 hours at 60°—70° C. Thereafter the polymer formed was precipitated in methanol, redissolved in benzene and reprecipitated in methanol.

Yield : 500 mg. of a copolymer of methyl methacrylate and the above spiropyran, comprising 50 mole percent of each monomer.

When modifying the relative quantities of methyl methacrylate and indolino-spiropyran, the ratio of their units in the copolymer was also varied.

The monomeric indolino-spiropyran as well as the copolymer formed were photochromic compounds.

EXAMPLE 3

5 ccs. of styrene, 0.4 g. of 1'-(2''-methacryloyloxyethyl)-3',3'-dimethyl-6-nitrospiro-[2H,1-benzopyran)-2,2'-indoline] of example 2, and 0.062 mg. of azobis-isobutyro-nitrile were dissolved in 10 ccs. of benzene. Copolymerization occurred as in example 2 and the copolymer was dried for 2 h. at 70° C. under reduced pressure. The copolymer comprised one indolino-spiropyran unit for every 40 styrene units.

EXAMPLE 4

200 ccs. of acetone were brought in a flask provided with a stirrer and a dropping funnel, whereupon 16.3 g. of p-acrylamidophenol and 18.2 g. of p-azidobenzoyl chloride were dissolved therein. While cooling on ice-water, a solution of 4 g. of sodium hydroxide in 50 ccs. of water was added dropwise. Subsequently the reaction mixture was stirred for 30 minutes at room temperature. The precipitate was sucked off and crystallized from a mixture of 900 ccs. of methanol and 400 ccs. of acetone.

Yield : 20.5 g. of 4-acrylamidophenol-(p-azidobenzoic acid ester) having the following formula were formed :

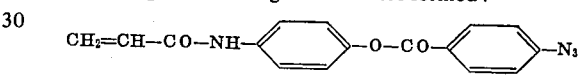

Melting point : 182° C.

5 ccs. of methyl methacrylate, 1 g of 1'(2''-methacryloyloxyethyl)-3',3'-dimethyl-6-nitrospiro-[(2H,1-benzopyran)-2,2'-indoline] of example 2, 1 g. of 4-acrylamidophenol-(p-azidobenzoic acid ester) prepared as above, and 0.062 mg. of azobis-isobutyronitrile were dissolved in 10 ccs. of dimethylformamide. The solution was brought in a glass pressure tube and freed from oxygen by introducing nitrogen for 10 minutes, whereafter the pressure tube was sealed. The whole was heated at 70° C. for 2 hours. The reaction mixture was then diluted with acetone and filtered. The copolymer formed was separated by adding methanol, and the copolymer was purified by redissolving in dimethylformamide and precipitating in methanol. The precipitate was dried under reduced pressure.

Yield : 3.3 g. of copolymer of methyl methacrylate, spiropyran, and of azido group-containing methacrylic acid ester.

The ratios of methyl methacrylate units to spiropyran units and of methyl methacrylate units to azido group-containing acrylamide units in the copolymer were 23:1 and 55.5:1 respectively.

All the copolymers of examples 1, 2, 3 and 4 were photochromic compounds in dissolved as well as in coated form on a support such as a polyethylene terephthalate film support. When exposing the solution or the coating to ultraviolet radiation, an intense color with an absorption maximum between 550 and 600 nm. was formed. A clear negative image of a line original was formed after exposing a layer of the copolymer for 15 seconds. When the image formed was kept in the dark, the color faded out as a result of the reversibility of the photochromic reaction.

However, when the copolymer of example 4, which contained photo-cross-linking groups, was exposed to ultraviolet radiation for 10 minutes, a photohardening reaction occurs in the system and the photochromic image formed was retained much longer than in the absence of photo-cross-linking groups.

The optical density of the image, which was 0.81 after exposure, was reduced to 0.355 after keeping for 16 hours in the dark. As a comparison the image formed in the same conditions in a layer of the copolymer of example 2 comprising no photo-crosslinking groups, had its optical density reduced in the same time to 0.025.

We claim:

1. Unsaturated photochromic monomeric indolino-spiropyrans, which are substantially colorless but are reversibly colored by themselves upon irradiation with actinic light and correspond to the general formula:

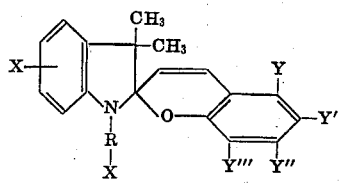

wherein:

R represents an alkylene group having one to 11 carbon atoms, a phenylene group, or a toluylene group, one of the X's represents acryloyloxy or methacryloyloxy, the other X representing hydrogen, Y and Y'' each represent hydrogen, nitrile, acetyl, carboxyl, hydroxyl, nitro, methoxy, chlorine or bromine, Y' represents hydrogen, acetyl, carboxyl, nitro, chlorine or bromine, and Y''' represents hydrogen, nitro, chlorine, or bromine.

2. Photochromic homopolymers of the unsaturated photochromic monomeric indolino-spiropyrans of claim 1.

3. Photochromic copolymers of the unsaturated photochromic monomeric indolino-spiropyrans of claim 1 with at least one other ethylenically unsaturated monomer.

4. Light-sensitive photographic material capable of forming nonfading images on exposure to actinic light, which comprises a light-sensitive layer or stratum comprising a photochromic monomer, homopolymer, or copolymer according to claim 1 and a photohardening polymeric system.

5. 1', 3', 3'-trimethyl-6'-methacryloyloxy-6-nitro-spiro[2H, 1-benzopyran-2,2'-indoline].

6. 1'-(2''-methacryloyloxyethyl)-3',3'-dimethyl-6-nitrospiro[2H, 1-benzopyran-2,2'-indoline].

7. The photochromic copolymer of 1',3',3'-trimethyl-6'-methacryloyloxy-6-nitrospiro[2H,1-benzopyran-2,2'-indoline] and methyl methacrylate.

8. The photochromic copolymer of 1'-(2''-methacryloyloxyethyl)-3',3'-dimethyl-6-nitrospiro[2H,1-benzopyran-2,2'-indoline] and methyl methacrylate.

9. The photochromic copolymer of 1'-(2''-methacryloyl-oxyethyl)-3',3'-dimethyl-6-nitrospiro[2H, 1-benzopyran-2,2'-indoline], methyl methacrylate, and 4-acrylamido-phenol-(p-axidobenzoic acid ester).

* * * * *